Oct. 27, 1931.  C. C. HARRIS  1,829,137

BATHING FLOAT

Filed May 3, 1929

Inventor
Carl C. Harris
By Attorneys
Southgate Fay &Harley

Patented Oct. 27, 1931

1,829,137

UNITED STATES PATENT OFFICE

CARL C. HARRIS, OF ORANGE, MASSACHUSETTS

BATHING FLOAT

Application filed May 3, 1929. Serial No. 360,185.

The principal objects of this invention are to provide a bathing float of very light construction which can be made at a low cost and will be durable and very convenient; to provide a float which will be reversible and which can be rolled up readily for transportation or storage and to provide a device of this character which can be made by the ordinary methods of manufacturing life preservers.

Other objects and advantages of the invention will appear hereinafter.

Reference is to be had to the accompanying drawings in which

Figure 1:
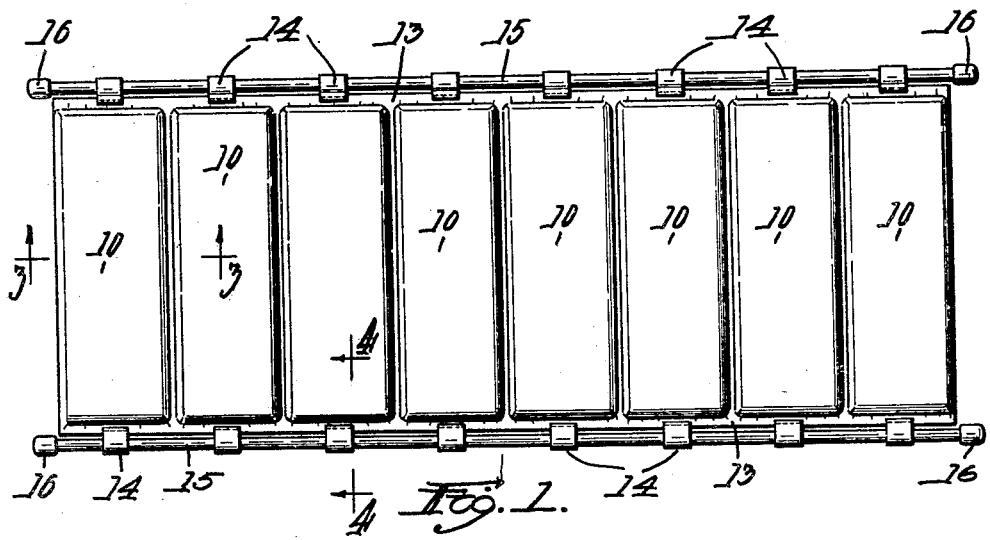
Fig. 1 is a plan of a float constructed in accordance with this invention.
Figure 2:
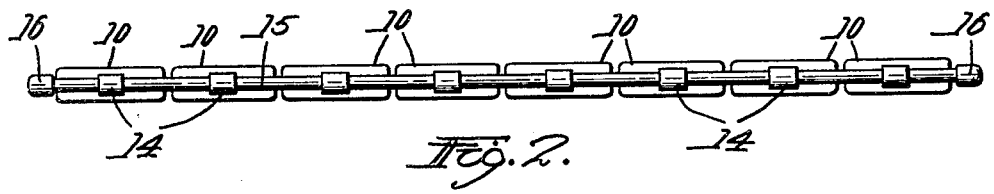
Fig. 2 is an edge view thereof.
Figure 3:
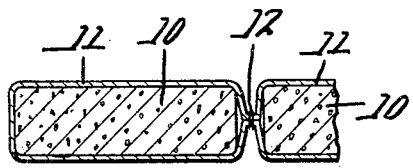
Fig. 3 is an enlarged longitudinal sectional view on the line 3—3 of Fig. 1.
Figure 4:
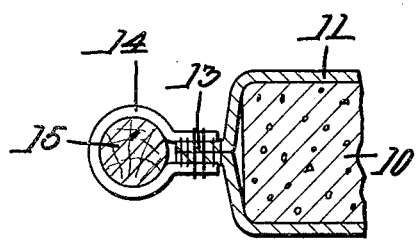
Fig. 4 is a still further enlarged transverse sectional view on the line 4—4 of Fig. 1.
Figure 5:
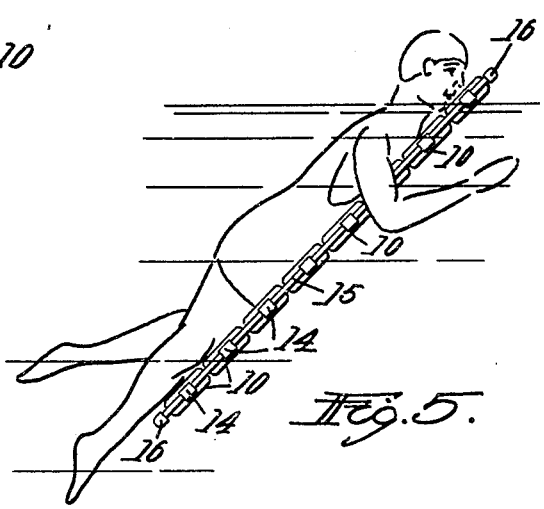
Fig. 5 is a side view showing the float in position for teaching swimming.

This invention relates to a float which can be used horizontally on the surface of the water, having means by which one or more bathers can grasp the sides for assisting them in swimming and which can be used in the position shown in Fig. 5 for carrying out that purpose more effectively.

The device is made up of a series of units or sections formed like a life preserver, preferably with a single piece of cork 10 inside and each surrounded by canvas covering 11. Preferably the canvas covering for a plurality of these corks is continuous and the layers are brought together between the cork pieces and held by a line of stitches 12 transversely of the entire article. Several of these are formed and all connected with each other as indicated.

At each side each one of these units is provided with a projection 13 formed of two thicknesses of canvas doubled over and to the outside of each projection is attached a strap 14 also preferably of canvas and formed in a loop. These loops 14 are all located in the same place at the ends of the sections and in alignment along the sides of the life preserver. A rod 15 of wood or other material is passed through the whole series of them.

The two rods on the two sides of the float are provided with rubber tips 16 so that they will not injure the operator when in use. These rods keep the series of units of the life preserver in a flat condition so that when used either horizontally or in the position shown in Fig. 5, the float will remain flat.

This constitutes a very effective float for the purpose described. The user can lie on it at any angle and have a comparatively rigid structure beneath him which will buoy him up and assist him in learning to swim and also he can lie flat on the surface of the water on this float. It can be used to assist a series of bathers, as each one can grasp the rod 15 at any point along the float and assist him in keeping up in the water.

On account of being covered with canvas it will not injure the operator when in use and the rubber tips on the rods also prevent injury from the ends of the rods. Its cost is materially lower than that of any other construction. It is reversible and it is very light to handle out of the water.

Another feature of advantage is that if it is desired to store or transport it, the rods 15 can be withdrawn and the device can be folded up into small compass.

Although I have illustrated and described only one form of the invention I am aware of the fact that modifications can be made therein by any person skilled in the art without departing from the scope of the invention as expressed in the claims. Therefore, I do not wish to be limited in this respect but what I do claim is:—

1. As an article of manufacture, a bathing float comprising a series of floats, each one covered with canvas and the canvas covering extending continuously about a series of them and sewed together between the floats, the canvas on each float having a loop connected therewith at the end and said loops being in alignment along both sides, and a pair of rods passing through the loops along each side, whereby the float is kept in flat condition by the rods and upon removal of the rods the float can be folded into small compass.

2. As an article of manufacture, a bathing float comprising a series of solid cork floats, each one entirely covered with canvas and the canvas covering extending continuously about a series of them and the top and bottom in contact and secured together between each two adjacent floats, whereby the whole float can be folded up when not in use, each cork float having a loop connected therewith at the end and said loops being in alignment along both sides and a pair of rods passing through the loops along each side.

In testimony whereof I have hereunto affixed my signature.

CARL C. HARRIS.